United States Patent
Hay et al.

(10) Patent No.: US 9,392,807 B2
(45) Date of Patent: Jul. 19, 2016

(54) METHOD OF MANUFACTURING PARTIALLY ROASTED COFFEE BEANS AND A COMBINATION ROASTING AND BREWING DEVICE

(71) Applicants: Ranald Joseph Hay, Bexley, OH (US); Kate Brooks Hay, Bexley, OH (US)

(72) Inventors: Ranald Joseph Hay, Bexley, OH (US); Kate Brooks Hay, Bexley, OH (US)

(73) Assignee: NEW ROAST COFFEE HOLDINGS LLC, Bexley, OH (US)

( * ) Notice: Subject to any disclaimer, the term of this patent is extended or adjusted under 35 U.S.C. 154(b) by 335 days.

(21) Appl. No.: 13/681,023

(22) Filed: Nov. 19, 2012

(65) Prior Publication Data

US 2013/0180406 A1   Jul. 18, 2013

Related U.S. Application Data

(60) Provisional application No. 61/586,991, filed on Jan. 16, 2012.

(51) Int. Cl.
| | |
|---|---|
| A23N 5/00 | (2006.01) |
| A23F 5/04 | (2006.01) |
| A47J 31/42 | (2006.01) |
| A47J 31/10 | (2006.01) |

(52) U.S. Cl.
CPC ............... *A23F 5/04* (2013.01); *A47J 31/106* (2013.01); *A47J 31/42* (2013.01)

(58) Field of Classification Search
CPC .................. A23F 5/04; F26B 3/06; F26B 3/08
USPC ............................. 34/359, 360; 426/466, 467
See application file for complete search history.

(56) References Cited

U.S. PATENT DOCUMENTS

| | | | |
|---|---|---|---|
| 2,325,683 A | | 8/1943 | Kayden |
| 3,964,175 A | * | 6/1976 | Sivetz ............................. 34/589 |
| 4,226,175 A | | 10/1980 | Sandor |
| 4,494,314 A | | 1/1985 | Gell, Jr. |
| 4,780,586 A | * | 10/1988 | Le Viet et al. ................. 219/700 |
| 5,368,875 A | * | 11/1994 | Hibi et al. ...................... 426/466 |
| 5,500,237 A | * | 3/1996 | Gell et al. ...................... 426/466 |

(Continued)

OTHER PUBLICATIONS

Sweet Maria's Coffee, An Updated Visual Guide to the Roast Process, Online: www.sweetmarias.com, (accessed Jan. 8, 2015).

*Primary Examiner* — Reginald L Alexander
(74) *Attorney, Agent, or Firm* — Standley Law Group LLLP

(57) ABSTRACT

Exemplary embodiments disclosed herein provide a method for producing primary roasted coffee beans where green coffee beans are roasted only until the point where the beans have reached the end of the primary roasting phase, where the beans are then quenched to stop the roasting process. In some embodiments, the end of the primary roasting phase is marked by the beans reaching the first crack stage. A disposable package containing primary roasted beans is also disclosed. A device for roasting and brewing ground coffee beans is also disclosed, the device having a porous container which accepts the ground coffee beans; a roasting container which accepts the porous container and has a sidewall containing an aperture; a fan and heating element positioned to force hot air through the aperture; a water containment vessel and heating subassembly positioned above the roasting container; and a water release valve assembly positioned between the water containment vessel and the roasting container.

14 Claims, 5 Drawing Sheets

(56) References Cited

U.S. PATENT DOCUMENTS

| | | | |
|---|---|---|---|
| 5,638,741 A * | 6/1997 | Cisaria | 99/295 |
| 5,718,164 A * | 2/1998 | Finken et al. | 99/355 |
| 5,749,288 A | 5/1998 | Skaling | |
| 5,939,121 A * | 8/1999 | Gutwein et al. | 426/466 |
| 5,960,561 A * | 10/1999 | Parodi et al. | 34/550 |
| 6,173,506 B1 | 1/2001 | Kruepke | |
| 8,734,885 B2 * | 5/2014 | Sweeney | 426/595 |
| 2010/0051602 A1 * | 3/2010 | Beardsley et al. | 219/429 |

* cited by examiner

METHOD OF MANUFACTURING PARTIALLY ROASTED COFFEE BEANS AND A COMBINATION ROASTING AND BREWING DEVICE

CROSS-REFERENCE TO RELATED APPLICATIONS

This application claims priority to U.S. Application No. 61/586,991 filed on Jan. 16, 2012 and is herein incorporated by reference in its entirety.

BACKGROUND OF THE INVENTIVE FIELD

Throughout coffee's history roasting has invariably been treated as a single continuous process: Green beans are roasted until completion of desired level, typically near 450° F. Depending upon the bean and the desired level of roast, the full roasting process typically takes anywhere from approximately 11 minutes to 14 minutes. Traditionally only completely roasted beans are ground for brewing preparation.

It is widely held that taste and smell are the most closely linked of the human senses. Even though aroma strongly (often overwhelmingly) effects flavor perception, the aromas of roasting coffee are typically not exploited in the brewing and serving of coffee. The presence of pre-roasted beans in shelf bins and the brewing of ground coffee, releases only a limited amount of prized aroma in typical homes and coffee shops. There is nothing to compare with the power of the sweet, smoky aromas of in-situ freshly roasted and ground coffee beans. However, due to the extended time required for roasting, the desire for quick service in a coffee shop or restaurant setting removes roasting from the realm of possibility.

Sequential stages of the traditional roasting process can be described thus:

Green fresh beans, at 0:00 minutes, ~72° F. (ambient): Coffee beans typically start with a semi-gloss finish, greenish in color.

"Blanching" Stage, ~4:00 minutes, ~270° F.-275° F.: The beans may turn a lighter blanched-yellowish color and typically emit a humid vegetal, straw-like smell as their temperature rises.

"First Yellowing" Stage, ~6:00 minutes, ~325° F.-330° F.: The bean typically expels steam. Important internal chemical reactions are endothermic. Aromas typically remain sultry. As the temperature rises further, acids begin to expire and to decompose, contributing to a typical acrid smell.

"Warm Khaki" Stage, ~6:30 minutes, ~375° F.-380° F.: The beans, still at their original size, typically begin to emit a dry pain grillé—toast aroma. The surface color typically darkens gently from yellowish to a warm khaki.

"Golden Beige" Stage, ~8:00 minutes, ~395° F.-400° F.: The bean's axial crevice typically starts to widen; Some expansion of the bean may be noticeable; Some chaff may shed; Some audible "First Crack" pops may be emitted. The beans are typically golden beige "toast" in color.

"First Crack" Stage, ~8:00-9:00 minutes, ~400° F.-415° F.: The steam typically becomes fragrant as the beans' various sugars begin to caramelize and as expelled acids diminish. Some oils may migrate from the interior of the bean outward. Audible cracking sound may be heard as exothermic reactions and caramelization roasting starts to occur. The beans' chaff may continue to separate. The beans may have swelled from about 50% to about 100% larger than their initial green-bean size. The beans typically have completely turned from light green to a distinctive matte, deep-golden beige color.

"First Crack" Stage complete, ~9:00-9:30 minutes, ~425° F.-430° F.: This marks the typical point where exothermic internal reactions are complete.

From about 10:00 minutes onwards: Traditionally this is called the "First Roast" or "City Roast" Stage: The first (lightly roasted beans) are considered herein as "City Roast."

Caramelization and Smoke: As sugar caramelization continues, oils may further migrate outwards and the beans may expand to final size as the roast becomes darker. A more fragrant, sweeter smoke may be emitted, typical of this next phase of the roast. As the roasting progresses the beans reach what is considered herein as "City Medium Roast" level.

At about 11:30 minutes: "Second Crack" Stage: Just past the "City Medium Roast" point a "second crack" noise may often be heard as the beans fracture internally, often more volatile than the "first crack." The darker roast-flavor character may begin to dominate the first City Roast character of the beans at this point. Mere seconds into "second crack" is considered herein as "Full City Roast."

At about 12 minutes mark: "Vienna Roast" is considered herein as the roast level fully through "second crack" to the point where the beans mostly cease cracking. Small pieces of the bean may be ejected much in the manner of popcorn.

Beyond 12 minutes: "French Roast" and "Darkening Roast" Stage: As the roast becomes typically very dark, the smoke may become more pungent as sugars burn completely and as some of the external oils burn and the bean structure breaks down further. This is considered herein as "French Roast," typically the final level of roast sold commercially.

Beyond French Roast the beans are typically considered burnt and undesirable for general commercial purposes.

In the traditional method, the roasted beans are then packaged for storage or for shipment. Often at completion the roasted beans are first ground to a desired size and then packaged for storage or shipment.

SUMMARY OF THE GENERAL INVENTIVE CONCEPT

The completion of the 'first crack stage' is the preferred point where, according to an exemplary embodiment, if the roasting process is stopped, for example by quenching or rapidly cooling the beans to create primary roasted beans, the flavors and aroma reactions may be kept stable for further roasting at another time.

'Primary Roasted' and 'Finish Roasted': For the purposes of describing the exemplary embodiments of the invention, the "first crack" stage typically marks the end of an early 'primary roasted' phase of preparation prior to the beginning of another, 'finish roasted' phase of roasting which, according to the exemplary embodiments herein, may be carried out at a later time.

As used herein, the terms 'primary roasted' and 'primary roast' are used to indicate a coffee bean which has been roasted to the point where, for a given bean varietal, it has preferably reached the "first crack" stage or beyond it but not fully roasted to the desired level of roast. The primary roasted beans of the disclosed method may be finish roasted upon demand, later if desired, in an expeditious manner, the longer primary roasting phase having been completed beforehand.

Each bean variety has its own unique point in time and temperature where roasting is sufficiently complete such that an interruption of the process during or upon completion of the "first crack" stage marks a stable product capable of further roasting at a later time. Depending upon the variety of bean, the preferred point of interruption may occur at this point or at another point in the roasting process, earlier or later.

Exemplary embodiments provide a method of roasting beans and a method of brewing coffee as well as devices for roasting and brewing coffee that dramatically enhance the aroma and flavor benefits of the presence of freshly roasting beans while also saving substantial preparation time whilst also reducing the presence of the early-stage acrid odors associated with roasting.

The presence of aroma profoundly effects the human perception of flavor, from a minor contribution all the way to overwhelming dominance. The in-situ presence, the "ambiance," of freshly roasting coffee beans may provide the consumer with an experience of the sweeter light volatile compounds, oils and caramel smoke that is normally diminished, evaporated or lacking entirely in typical commercial pre-roasted and pre-ground coffees. The experience of fresh 'finish-roast' smoke and aroma may greatly enhance the coffee's flavor. This experience may also enhance the value of the coffee product and indirectly enhance the value of the venue of its consumption.

The exemplary embodiments of the devices and methods taught herein separate the traditional coffee roasting process into two phases. Distinct advantages are gained in separating the coffee roasting into two phases. Firstly, depending upon the bean varietal, there is a savings of about ten minutes of preparation time when starting from primary roasted beans over fresh green beans.

A typical characteristic of the first 'primary stage' of roasting is sultry and acrid aromas, with little of the sweet aroma and smoke of the finish roast phase. Another distinct advantage is that this first 'primary stage' of roasting may be performed off-site, leaving the enhanced aromas of 'finish roasting' available for another location at another time.

Another advantage is that primary roasted beans may be pre-ground and packaged whilst still retaining valuable aromas, light volatile compounds, sugars and oils for release later in 'finish roasting.'

Another advantage is that the method allows the consumer to prepare freshly roasted and brewed coffee in about the same amount of time normally taken by standard brew machines. The 'finish roasting' process occurs in about the time or less than is necessary to bring water up to brew temperature. This fact permits concurrent 'finish roasting' of the beans with raising of the water temperature.

In one exemplary embodiment of the invention, a serving of ground primary roasted beans is placed in the oven portion of an exemplary embodiment of the roasting brewer. The ground beans may be pre-packaged in a roasting packet, or they may be placed loose into a roasting vessel assembly held within the oven of the roasting brewer.

The beans will preferably remain in their 'finish roasting' vessel during the roast. Some smoke and aroma will preferably be released into the atmosphere. Some smoke and aroma will preferably be captured by the heated water and brewed coffee during the brewing cycle.

When the water reaches brew temperature (typically around 210° F. to 212° F.) it is generally ready to combine with the freshly finish-roasted beans. Brewing ends the roast process and preferably delivers flavor and additional aroma with the brewed coffee into the coffee service vessel. The consumer may then observe distinct differences in the finished coffee product and the ambient aromas associated with a freshly finish-roasted brew.

This embodiment has a distinct advantage over traditional small brewing machines in that while cold water is being heated ready for the brew stage, a process of typically two to four minutes, there is also sufficient time to concurrently finish roast a serving of prepared ground primary roast beans.

Further embodiments of the invention provide a disposable roasting-brewing packet: A portion of pre-ground primary roasted coffee beans may be encapsulated within a vessel. The packet will preferably contain the ground coffee during the finish roasting phase and the brewing phase. The packet will have surfaces preferably made of porous filter material (for example, metallic filter screen) that will permit the passage of heated air through the packet on one surface, through the roasting coffee and so through the second porous filter.

In an exemplary embodiment, the passage of roasting air distributed evenly (for example, by swirling the air axially) through the packet assures a sufficiently even distribution of temperature and airflow during the finish roasting phase.

In common practice, beans are roasted by machines set to create an evenly, substantively homogeneous roasted bean, thus avoiding burning and spot-scorching that can be detrimental to the flavor of the product. Exemplary embodiments of the present invention duplicate common practice by assuring that air flow and air temperature are appropriately adjusted such that the roasting ground beans are all at the same stage of roast throughout until completion.

Initial efforts with various embodiments and air flow and air temperature resulted in a stratified roasted product: Under these conditions, the upper (inner) strata of ground beans are subjected to more roasting than the lower (outer) strata of ground beans, thus creating a differentially finish roasted product. In extreme circumstances, the hotter stratum burns and thus spoils the product's flavor and it spoils the emitted scent of the roast.

In other extreme circumstances, the upper (inner) stratum of beans reaches completion while the lower (outer) stratum remains insufficiently roasted. The resulting flavors are not always preferable.

Surprisingly, differential roasting is advantageous in certain circumstances. In another exemplary embodiment, the temperature of the roasting air and the relative internal pressure of the roasting vessel are created such that the roasting ground beans do not roast at an effectively even rate clear through. This embodiment creates a stratified roasted product that results in one roasted (i.e. French Roast) product on the interior stratum of grounds while the lower (outer) stratum reaches a milder roast (i.e. City Roast) stage.

Roasting differentiation creates a superior roasted product in some varieties of beans. With some varieties, the resulting flavor spectrum is found to be preferable due to it's being broader and/or more rounded. Depending on the flavors desired, roasting differentiation using stratification can be adjusted to deliver one homogenous roast throughout (i.e. City Roast) or to any continuous spectrum of roasts (i.e. French Roast to Medium Roast.)

In some embodiments, once the brewing is complete, a disposable packet may be removed and properly discarded.

Further embodiments of the invention provide a reusable roasting-brewing vessel assembly: A portion of pre-ground primary roasted coffee is placed within a reusable vessel assembly, preferably comprising a reusable porous upper filter and a reusable porous lower filter. The assembled reusable roasting-brewing vessel may contain the pre-ground primary roast coffee during the 'finish roasting' phase and the brewing phase. The upper and lower filters are preferably made of porous filter material (for example, fine metallic filter screen) that will permit the passage of heated air through the assembly on one surface, through the roasting coffee and so through the second porous surface.

In an exemplary embodiment, the passage of roasting air distributed (for example, by swirling the air axially) evenly through the roasting-brewing assembly assures a sufficiently even distribution of temperature and airflow during the finish roasting phase.

When the desired roasting level is complete and the brew water is at temperature, heated brew water may be introduced to the assembled reusable roasting-brewing vessel and allowed to filter through the ground, freshly-roasted coffee, through the porous filter and on to coffee service vessel.

Once the brewing is complete, the roasting-brewing vessel may be disassembled for cleaning.

The foregoing and other features and advantages will be apparent from the following more detailed description of the particular embodiments of the invention, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION OF EXEMPLARY EMBODIMENT(S)

Figure 1:
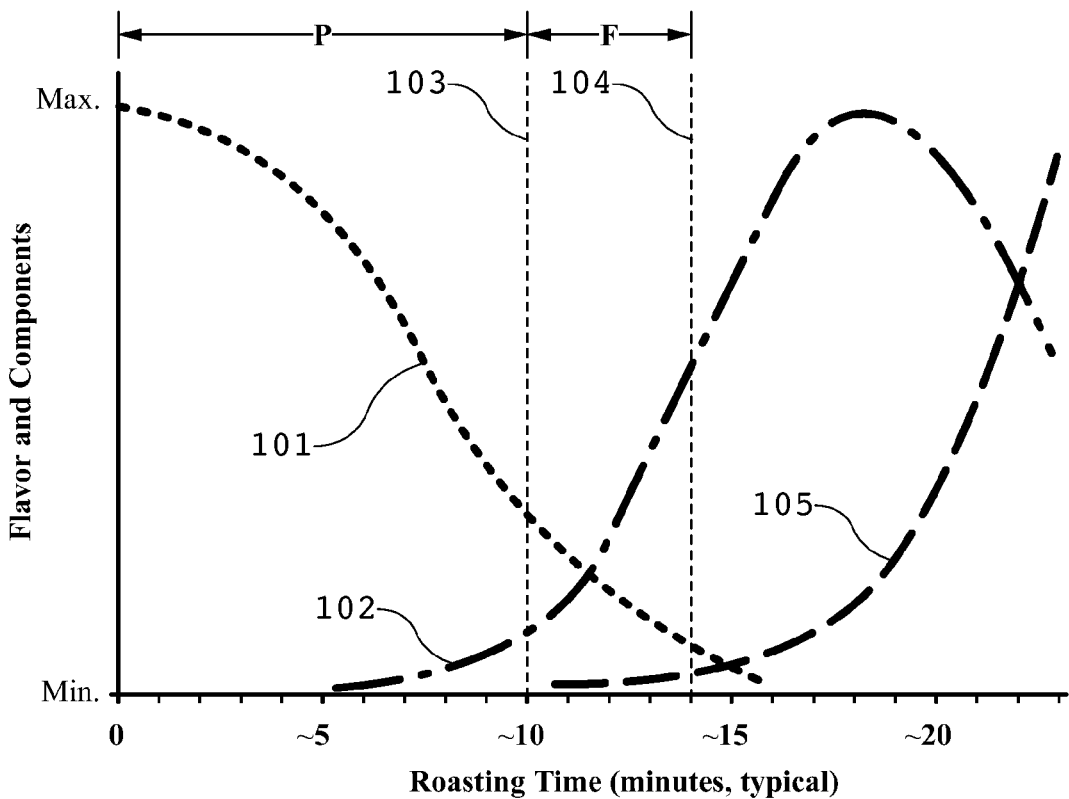
FIG. 1 provides a graphical representation of the Bean Roasting Phases and Aroma Components.

In addition to the features mentioned above, other aspects of the exemplary embodiments of the present invention will be readily apparent from the following descriptions of the drawings and exemplary embodiments, wherein like reference numerals across the several views refer to identical or equivalent features, and wherein: several views refer to identical or equivalent features, and wherein:

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

Spatially relative terms, such as "lower", "upper" and the like, may be used herein for ease of description to describe the relationship of one element or feature to another element(s) or feature(s) as illustrated in the figures.

It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A first embodiment of the invention provides a method of manufacturing partially roasted coffee beans which comprises the steps of roasting green coffee beans to a specific point at the end of the 'primary roasting' phase, preferably completed by quenching the beans (preferably rapidly cooling the beans to ambient or lower temperature).

Please refer to the graph of FIG. 1. The horizontal axis represents a typical roast cycle, graduated in minutes, from start to fully burnt. The vertical axis represents appearance or value of various phenomena, graduated from minimum to maximum. Line 101 represents acidic and vegetal flavors and aroma typical of fresh or partially roasted coffee beans. Line 102 represents caramelization (controlled burning) of internal sugars. Vertical line 103 represents the completion of the Primary Roasting Phase (about 10 minutes) and vertical line 104 represents the completion of the Finish Roasting Phase, shown at the end of a full French Dark Roast (about 14 minutes.) Line 105 represents carbonization burning of the beans' oils and cellulosic material. The primary roasted whole beans may be packaged for delivery to the consumer to finish roast, grind and brew as needed.

Alternatively [in another preferred embodiment] the primary roasted beans may then be ground to a desired size and packaged 'loose' for delivery to the consumer, to be finish roasted as desired and brewed as needed.

Alternatively [in another preferred embodiment] the primary roasted beans may be ground to a desired size prior to finish roasting, then packaged into single-serving or multiple-serving roasting and brewing packages for use in machines designed to finish roasted and then brewed for delivery to the consumer.

The above methods permit 'on-demand' roasting in an expeditious manner for local commercial coffee shops and for home coffee brewers in which the roasting aromas may be most pleasant, where the ambient presence of the roasting aromas may dramatically enhance the flavor experience, where the preparation time may be greatly reduced and the freshness of the brewed coffee product may be maximized.

Additionally, the above methods permit the brewer and consumer to maximally experience the sweet aromas of the roasting and brewing process and for some of the aromas to be captured freshly in the brewed coffee product.

Figure 2:
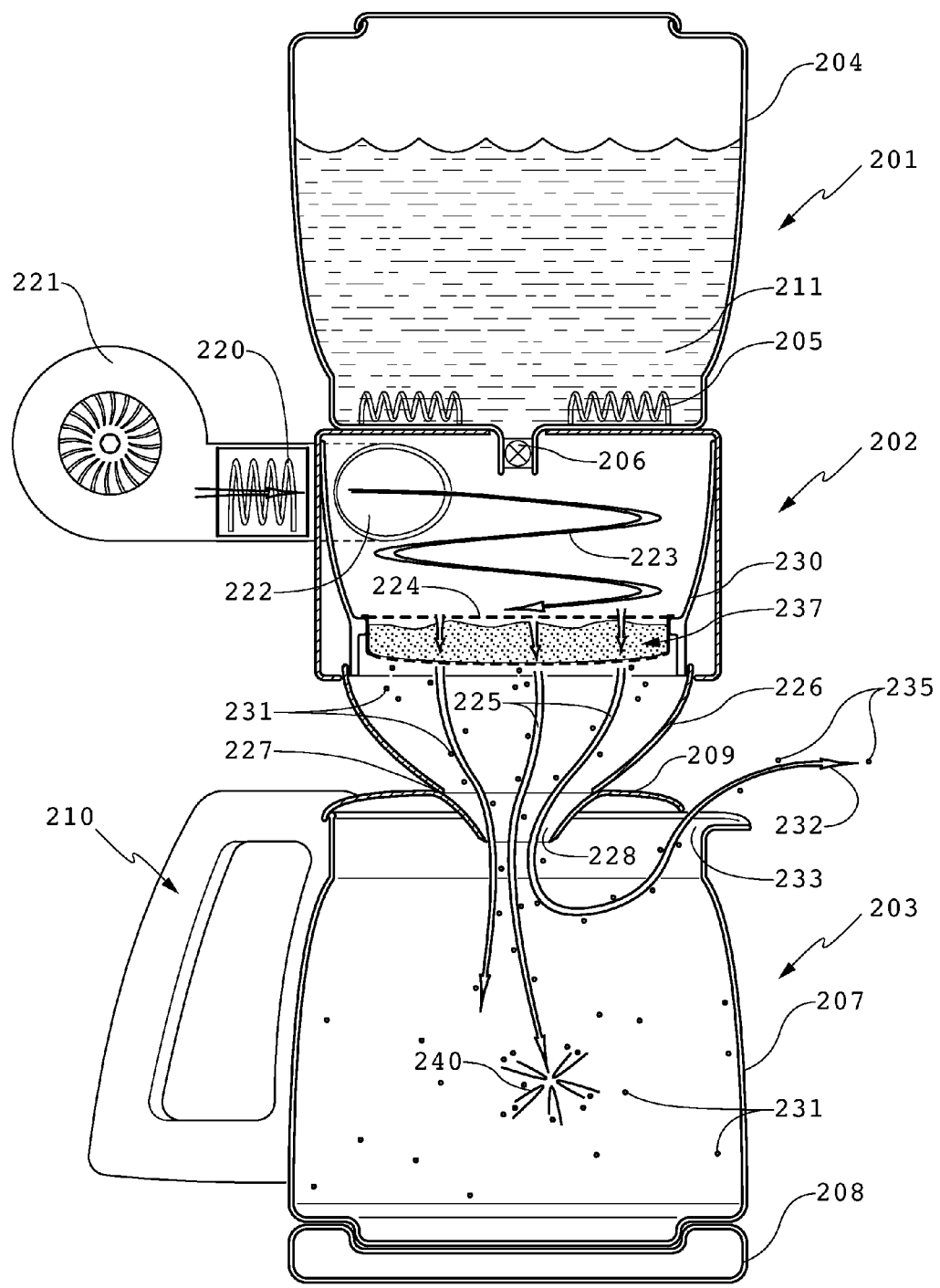
FIG. 2 provides a sectional view of an exemplary embodiment of the device during the 'finish roasting' phase.

Please refer to FIG. 2: In a preferred embodiment, the shown brewing device is a combination of roaster and brewer ('roasting brewer') comprised of three main assemblies: Water heating assembly 201 is shown atop a roasting and brewing assembly 202, above and in contact with coffee pot assembly 203. Water heating assembly 201 is comprised of containment vessel 204, heating and water temperature controller sub-assembly 205 and water release valve assembly 206. Vessel 204 contains brew water 211 in preparation for brewing.

In a preferred embodiment, coffee pot assembly 203 is comprised of main coffee vessel 207, preferably glass, lid assembly 209 with aperture 228 and handle assembly 210. Coffee service vessel assembly 203 preferably sits atop a warming plate assembly 208.

In a preferred embodiment, heating element 220 raises the temperature of forced air expelled from fan 221 and eccentrically ported through aperture 222, raising the internal air pressure of roasting container 230 so that the air cycles along swirl path 223, circling around the central axis of the roasting container 230 and traveling downward. In some embodiments, the air travels in a helical path downward through the ground coffee after entering the roasting container 230. Coffee grounds roasting pack assembly 224 lies at the bottom of roasting container 230. Higher-pressure heated air passes evenly diffusing through the upper surface of roasting pack assembly 224 and through primary roasted ground coffee package 237 towards the lower pressure ambient environment. Preferably, the upper surface of the roasting pack assembly 224 is comprised of a material that will not substantially degrade when exposed to roasting hot air, typically in excess of 400 degrees Fahrenheit and sometimes near 451 degrees Fahrenheit.

Wafting smoke and aroma particles 231 travels paths 225 through aroma and brew guide vessel 226, in contact with coffee pot lid 209 along a contact 227, through lid aperture 228 into coffee service vessel 207. Some of the coffee smoke and vapors precipitate at the inside of vessel 207 as typified by site 240. Other smoke particles may escape through pour spout aperture 233 along path 232 releasing smoke and aroma 235 into the ambient atmosphere.

Figure 3:
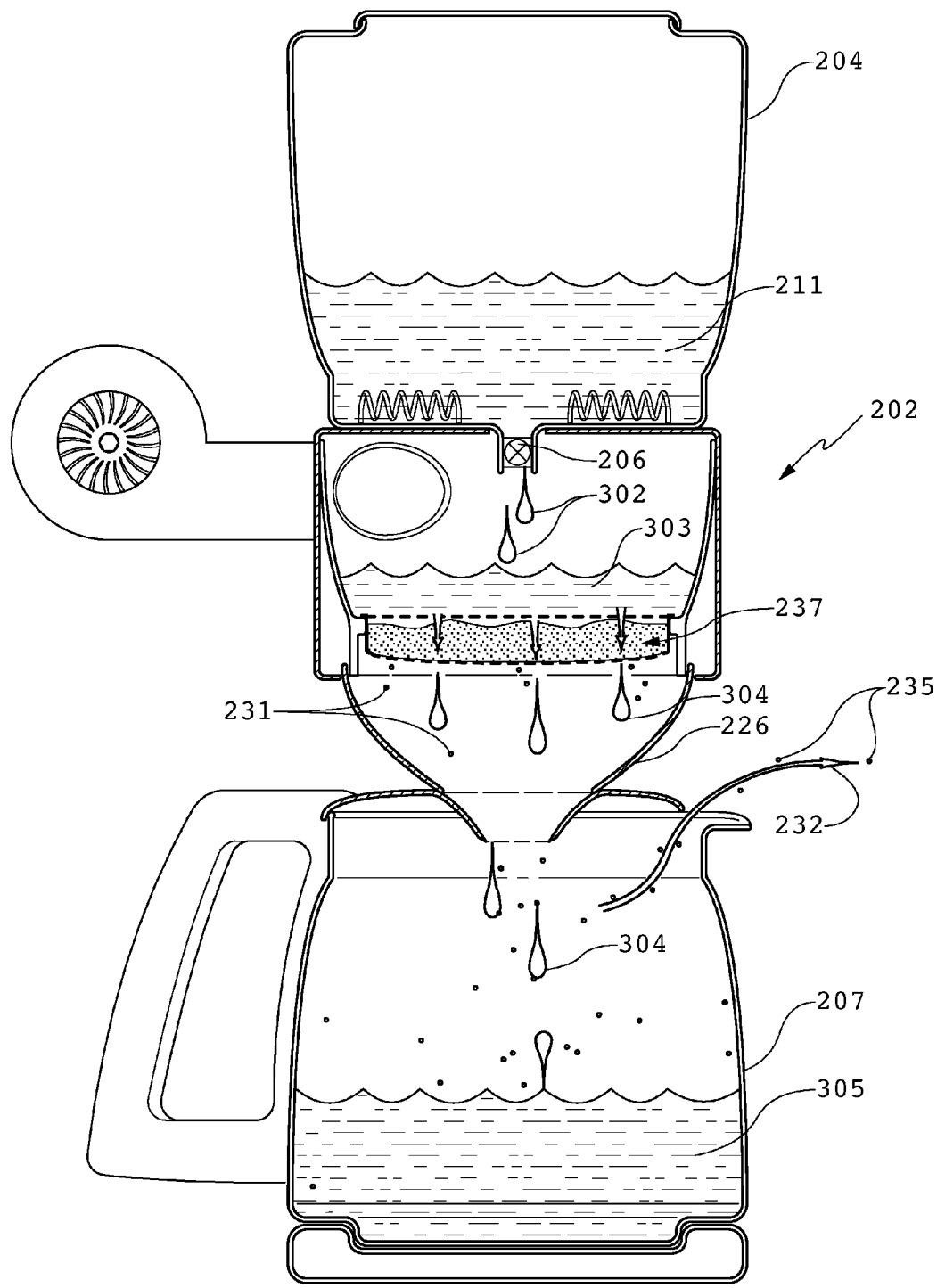
FIG. 3: provides a sectional view of an exemplary embodiment of the device during the brewing phase.

Please refer to FIG. 3: At the appropriate time and temperature, heated water 211 in containment vessel 204 is released through valve assembly 206 into the roasting and brewing assembly 202. Heated water 302 pools above primary roasted ground coffee package 237 in pool 303. Brewed coffee 304 drips from primary roasted ground coffee package 237 into aroma and brew guide vessel 226 whilst absorbing freshly occurring smoke and aroma 231.

Brewed coffee 304 drips into coffee service vessel 207, pooling as brewed coffee 305 whilst continuing to absorb deposits and aromas 231 from the air and sides of vessel 207. Some fresh brewing aromas and remaining roasting aromas 235 may escape along path 232 into the ambient environment.

Figure 4A:
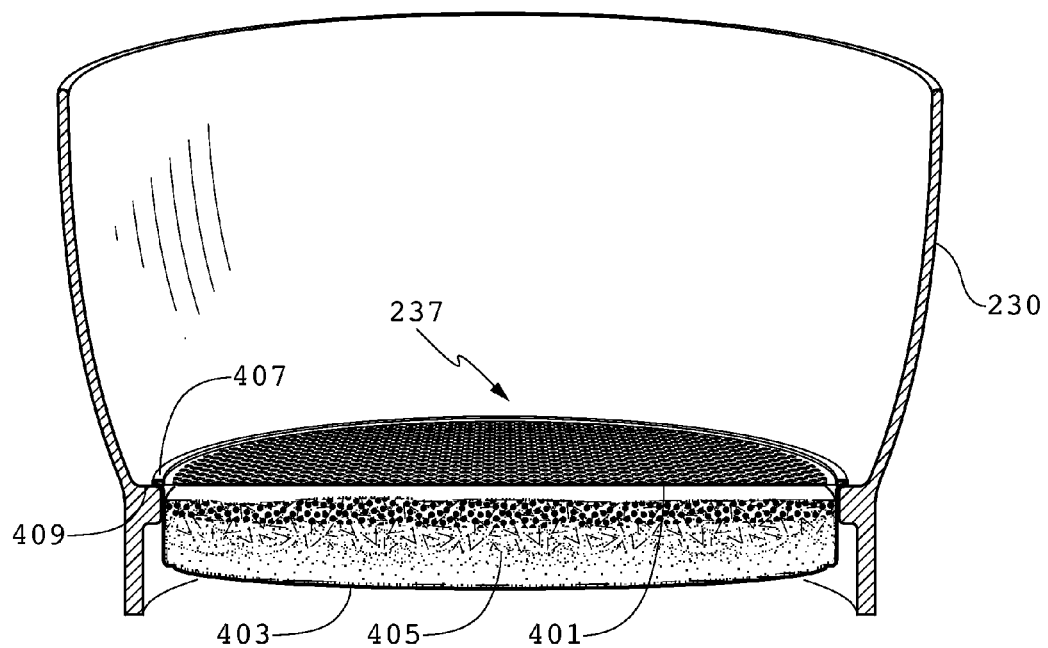
FIG. 4A provides a sectional view of an exemplary embodiment of the primary roasted ground coffee package within a roasting container, stratified roasting is illustrated.

Please refer to FIG. 4A: Primary roasted ground coffee package 237 is comprised of upper filter mesh 401 connected to lower filter body 403 along seam 407, containing ground primary roasted coffee product. In an exemplary embodiment, the filter mesh 401 would be metallic, but it may be ceramic, plastic or a suitable composite material. Primary roasted ground coffee package 237 preferably sits in roasting container 230 atop rim seating ledge 409. Preferably, upper filter mesh 401 is comprised of a material that will not substantially degrade when exposed to roasting hot air, typically in excess of 400 degrees Fahrenheit and sometimes near 451 degrees Fahrenheit.

In an exemplary embodiment, roasted coffee 405 is stratified, with a deeper roast in the upper (inner) stratum varying to a lighter roast in the lower (outer) stratum.

Figure 4B:
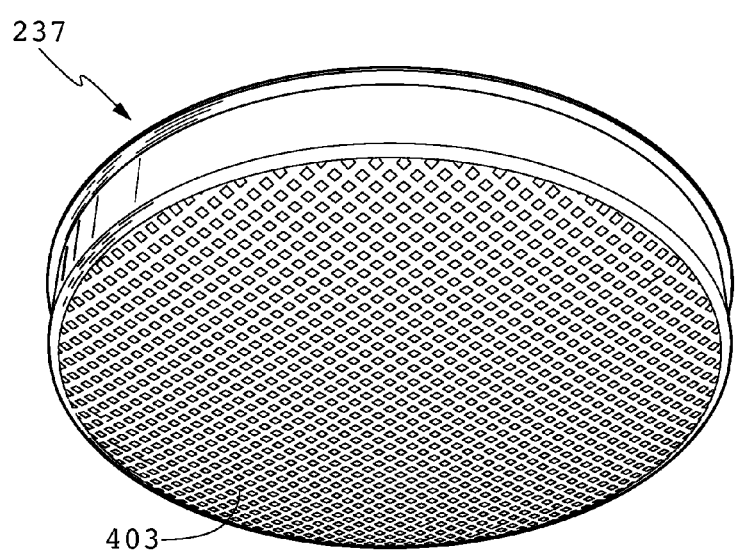
FIG. 4B provides a bottom perspective view of an embodiment of a primary roasted ground coffee package.

Please refer to FIG. 4B: Primary roasted ground coffee package 237 is tilted to show the lower filter body 403. In an exemplary embodiment, the filter body 403 would be metallic, but it may be ceramic, plastic or a suitable composite material.

Figure 5A:
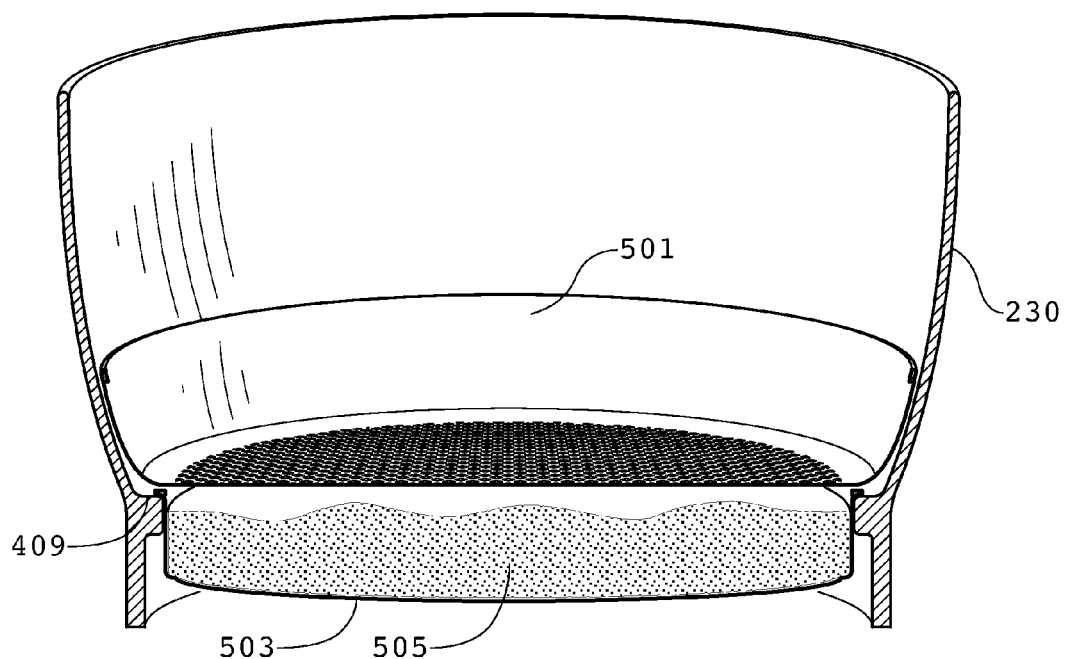
FIG. 5A provides a sectional view of an exemplary embodiment of the Reusable Roast-Brew Coffee Filter Elements in Brew Vessel, homogeneous roasting is illustrated.

Please refer to FIG. 5A: Primary roasted loose ground coffee 505 sits in reusable lower filter tray 503 within vessel 230 atop vessel rim 409. In an exemplary embodiment, the lower filter tray 503 would be metallic, but it may be ceramic, plastic or a suitable composite material.

Reusable upper filter tray 501 sits atop lower tray 503 to contain primary roasted loose ground coffee 505. In an exemplary embodiment, the upper filter tray 501 would be metallic, but it may be ceramic, plastic or a suitable composite material. In an exemplary embodiment, coffee 505 is roasted evenly throughout. Preferably, upper filter tray 501 is comprised of a material that will not substantially degrade when exposed to roasting hot air, typically in excess of 400 degrees Fahrenheit and sometimes near 451 degrees Fahrenheit. In an exemplary embodiment, coffee 505 is roasted evenly throughout.

Figure 5B:
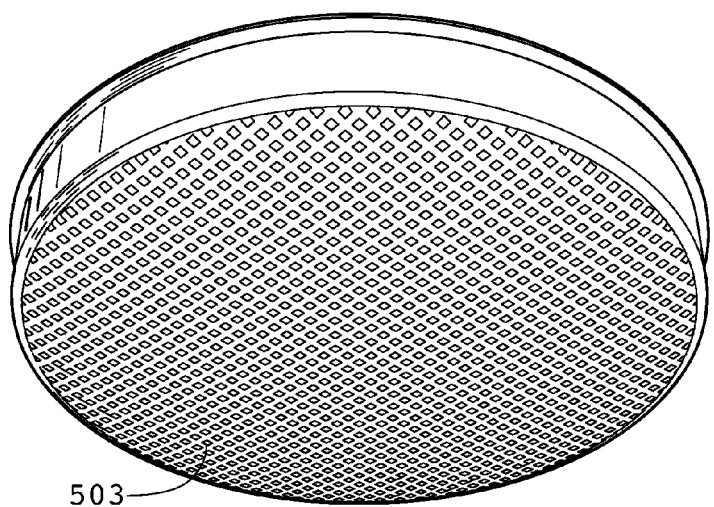
FIG. 5B provides a bottom perspective view of an embodiment of a Reusable Roast-Brew Coffee Filter Element.

Please refer to FIG. 5B: Reusable metallic lower filter tray 503 is tilted to show the lower filter at bottom. In an exemplary embodiment, the lower filter tray 503 would be metallic, but it may be ceramic, plastic or a suitable composite material.

Having shown and described preferred embodiments, those skilled in the art will realize that many variations and modifications may be made to affect the described embodiments and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A method for producing primary roasted coffee beans, comprising the steps of:
    roasting a plurality of green coffee beans; and
    quenching the beans once a majority of the beans have reached the start of the first crack stage but prior to the majority of the beans reaching the end of the first crack stage to produce primary roasted coffee beans which have not reached a full level of roast for brewing and consumption.

2. The method of claim 1 further comprising the step of: grinding the primary roasted beans and packaging them.

3. The method of claim 1 further comprising the step of: packaging the primary roasted beans.

4. The method of claim 1 further comprising the step of:
    grinding the primary roasted beans; and
    placing the beans within a disposable container which sandwiches the primary roasted and ground beans between an upper and lower filter.

5. The method of claim 1 wherein the step of quenching comprises:
    rapidly cooling the beans to a temperature lower than a roasting temperature.

6. A method for producing primary roasted coffee beans, comprising the steps of:
    roasting a plurality of green coffee beans; and
    quenching the beans before the exothermic internal reactions are complete to produce a plurality of beans; wherein the primary roasted beans have not been permitted to start the second crack stage of the roasting process comprising a majority of primary roasted beans.

7. The method of claim 6 further comprising the step of: grinding the primary roasted beans and packaging them.

8. The method of claim 6 further comprising the step of: packaging the primary roasted beans.

9. The method of claim 6 further comprising the step of:
    grinding the primary roasted beans; and
    placing the beans within a disposable container which sandwiches the primary roasted and ground beans between an upper and lower filter.

10. A method for producing primary roasted coffee beans, comprising the steps of:
    roasting a plurality of green coffee beans only until the majority of the beans have reached the start of a first crack stage; and
    quenching the beans before the first crack stage is complete to produce a plurality of beans comprising a majority of primary roasted beans which are not finish roasted after performing the quenching step but are conditioned to be finish roasted at a later time for brewing and consumption.

11. The method of claim 10 further comprising the step of: grinding the primary roasted beans and packaging them.

12. The method of claim 10 further comprising the step of: packaging the primary roasted beans.

13. The method of claim 10 further comprising the step of:
    grinding the primary roasted beans; and
    placing the beans within a disposable container which sandwiches the primary roasted and ground beans between an upper and lower filter.

14. A batch of primary roasted coffee beans comprising:
    a plurality of beans produced using the process described in claim 10.

\* \* \* \* \*